Patented June 24, 1941

2,246,595

UNITED STATES PATENT OFFICE 2,246,595

METHOD OF OBTAINING PREGNANDIONE COMPOUNDS

Russell Earl Marker, State College, Pa., assignor to Parke, Davis & Company, Detroit, Mich., a corporation of Michigan No Drawing. Application November 4, 1937, Serial No. 172,853

3 Claims. (Cl. 260—397)

The invention is concerned with the preparation from pregnant mare's urine of di-oxygenated pregnane compounds. The invention relates more specifically to production of pregnandiol-3,20 and allo-pregnandiol-3,20 and certain fractions from pregnant mare's urine containing these diols.

Pregnandiol-3,20 and allo-pregnandiol-3,20 have been obtained from human pregnancy urine. However, it is generally accepted that there are none of these compounds present in mare's pregnancy urine, and attempts to isolate it from the latter source have been unsuccessful.

It has now been found that carbinol fractions can be obtained from mare's pregnancy urine containing substantial amounts of pregnandiol-3,20 and allo-pregnandiol-3,20. It has also been found that these diols may be readily oxidized to their corresponding diketone derivatives and, thereafter, the latter can be recovered from the complex oxidation mixture in good yields.

The invention will be more readily understood from the following examples given merely by way of illustration and not by way of limiting to the specific procedures or materials described therein.

Example 1

A quantity of pregnant mare's urine, either before or after hydrolytic treatment, is extracted with butyl alcohol. The butyl alcohol extract contains pregnandiol-3,20 and allo-pregnandiol-3,20 and may be used to obtain pregnane and allopregnane derivatives oxygenated at both the $C_3$ and $C_{20}$ atoms, such as pregnandiol, allo-pregnandiol, pregnandione and allo-pregnandione.

Instead of using butyl alcohol for the extraction, any other suitable organic solvent in which pregnandiol and allo-pregnandiol are soluble may be used. For example, ethyl alcohol and other alcohols, benzene, esters such as ethylacetate, ethers such as diethylether, acetone, chloroform, dichlorethylene, etc.

Example 2

Pregnant mare's urine is treated as described in Journal of Biological Chemistry, vol. 87, page 357 et seq. (1930) to separate out phenolic compounds and to obtain a carbinol residue or fraction. The carbinol fraction thus obtained is like the product of Example 1 in being useful as a product containing substantial amounts of pregnandiol and allo-pregnandiol capable of being readily worked up by suitable methods for separating out pure pregnandiol and allo-pregnandiol type compounds.

Example 3

Diatomaceous earth is added to a quantity of hydrolyzed or unhydrolyzed pregnant mare's urine and thereafter the mixture is filtered, the filtrate discarded and the adsorbent containing adsorbed materials is dried and then extracted with ether. The ether extract is washed with an alkaline solution and the ether evaporated from the washed extract. A tarry residue is thus obtained which is steam-distilled and the residue in the still heated and extracted with strong sodium hydroxide solution. The residue remaining after extracting with caustic solution is extracted with benzol and with ether, the benzol-ether extract washed with a small amount of alkali solution, then with water, and the benzol and ether finally evaporated off. A residue which may be designated, Residue-A, is thus obtained.

In this example, instead of using diatomaceous earth, any other suitable adsorbent, such as fuller's earth, alumina, silica gel, calcium carbonate, carbon, etc., may be used to obtain the original carbinol fraction of pregnant mare's urine containing substantial quantities of pregnandiol and allo-pregnandiol.

Example 4

A non-phenolic extract from 1000 gallons of pregnant mare's urine, such as Residue-A of Example 3, is dissolved in 3½ liters of glacial acetic acid. To this solution there is added 300 grams of chromium trioxide dissolved in 1½ liters of 80% acetic acid at a temperature of 20° C. and with stirring over a period of 2 hours. Stirring is continued 2 hours more after all the chromium trioxide has been added. The excess chromium trioxide is destroyed by adding alcohol to the reaction mixture and reacting it with the chromium trioxide. The resulting acetic acid solution is concentrated in vacuo to a volume of about 1.5 liters. The concentrate is stirred with ether and water until it goes into solution. The ether layer is separated and washed free of acids with 10% sodium hydroxide solution. Insoluble salts of tarry acids may separate at this point and can be filtered off. The residue is dissolved in a liter of boiling alcohol and 50 grams of Girard's reagent (for example, trimethylaminoacetohydrazide hydrochloride) is added. The reaction mixture is heated 20 minutes and then poured onto ice and extracted with ether. The aqueous layer is acidified with hydrochloric acid and heated on a steam bath for 30 minutes. The ketones are extracted with ether, the ether is evaporated off, and the residue dissolved in one liter of alcohol. This alcoholic solution is refluxed for an hour with 50 grams of semicarbazide hydrochloride and 60 grams of sodium acetate. After cooling, the precipitated mixture of di-semicarbazones of the pregnandiones is filtered and then freed of sodium chloride by washing with boiling water. The washed semicarbazones are heated with one liter of boiling alcohol and filtered while hot. This leaching process is repeated three times, giving 62 grams of a mixture of the di-semicarbazones of pregnandione and allo-pregnandione.

A suspension is made of the 62 grams of di-semicarbazones in 2½ liters of alcohol. To this suspension there is added a solution of 250 cc. of sulfuric acid in 500 cc. of water. The mixture is heated two hours on a steam bath and then poured into water and filtered. The solid on the filter is dissolved in ether and again filtered to remove any small amount of insoluble material present. The ether is distilled off and the residue dissolved in alcohol and treated with decolorizing charcoal (Norit). The mixture is filtered, the alcohol evaporated from the filtrate, and the residue taken up in acetone and then crystallized therefrom. The crystals are filtered off and the mother liquor or filtrate retained for further treatment to get pregnandione-3,20. For convenience, these mother liquors can be designated Solution-III. The crystals are dissolved in acetone and crystallized therefrom two more times. They then have a melting-point of 199° C. This product is allopregnandione and gives no depression in melting-point when mixed with allo-pregnandione prepared from allo-pregnandiol of human pregnancy urine by oxidation.

Anal. calc. for $C_{21}H_{32}O_2$: C, 79.7; H, 10.2. Found: C, 80.1; H, 10.2.

The di-semicarbazone of this product does not melt below 325° C.

Anal. calc. for $C_{23}H_{38}O_2N_6$: C, 64.2; H, 8.9. Found: C, 64.8; H, 9.1.

Solution-III, the mother liquors from allo-pregnandione, is evaporated to dryness and the residue distilled, using a mercury pump, at a pressure below about 0.1 mm. and collecting the fraction distilling below 150° C. This distillate is crystallized from dilute acetone to give a product melting at 119° C. It is pregnandione and gives no depression in melting-point when mixed with pregnandione obtained by oxidizing pregnandiol from human pregnancy urine.

Anal. calc. for $C_{21}H_{32}O_2$: C, 79.7; H, 10.2. Found: C, 80.1; H, 10.1.

The di-semicarbazone of this product melts at 257° C. with decomposition.

Anal. calc. for $C_{23}H_{38}O_2N_6$: C, 64.2; H, 8.9. Found: C, 64.6; H, 9.2.

The di-semicarbazone of pregnandione is more soluble in alcohol than the di-semicarbazone of allo-pregnandione. Therefore, in this example the two di-semicarbazones can also be separated by fractional crystallization and then hydrolysis to the separated pregnandione and allo-pregnandione instead of hydrolyzing to a mixture of the diones first and then fractionating.

The examples given above are only intended to illustrate the invention. Various other equivalent reagents and conditions may be used in the examples in accordance with the general disclosure with comparable results.

What I claim as my invention is:

1. Method for the preparation from pregnant mare's urine of pregnandione-3,20 and allo-pregnandione-3,20 which comprises separating from the urine a water-insoluble carbinol fraction, removing phenolic substances from said fraction, oxidizing the phenol-free fraction with an oxidizing agent capable of converting the hydroxyl groups of pregnandiol-3,20 and allo-pregnandiol-3,20 into ketone groups, converting the resulting diketone compounds into hydrolyzable derivatives differing in their solubilities in solvents, separating said derivatives of pregnandione-3,20 and allo-pregnandione-3,20 from one another by means of said differences in solubilities, and hydrolyzing the separated derivatives to obtain pregnandione-3,20 and allo-pregnandione-3,20 separate from one another.

2. In a process for the preparation from natural sources of pregnane and allo-pregnane compounds having ketonic groups attached to carbon atoms 3 and 20 of the molecule, the step which comprises oxidizing a non-phenolic carbinol fraction of pregnant mare's urine with an oxidizing agent capable of converting said hydroxyl groups to ketone groups.

3. Process for obtaining pregnandione-3,20 and allo-pregnandione-3,20 which comprises oxidizing a non-phenolic carbinol fraction of pregnant mare's urine with an oxidizing agent capable of converting the hydroxyl groups of pregnandiol-3,20 and allo-pregnandiol-3,20 into ketone groups, treating the resulting diketone compounds with a reagent capable of condensing with said diketone compounds to form a derivative capable of hydrolysis and regeneration of the diketone compounds, to form hydrolyzable derivatives differing in their solubilities in a solvent, fractionally crystallizing from said solvent said hydrolyzable derivatives of pregnandione-3,20 and allo-pregnandione-3,20, thereby separating said dione derivatives from one another, and hydrolyzing the separated derivatives to obtain pregnandione-3,20 and allo-pregnandione-3,20.

RUSSELL EARL MARKER.